MAGNETIC TAPE TRANSDUCER

Filed Sept. 10, 1962

INVENTOR.
JAMES U. LEMKE
BY
Christie, Parker & Hale
ATTORNEYS.

United States Patent Office 3,182,300
Patented May 4, 1965

3,182,300
MAGNETIC TAPE TRANSDUCER

James U. Lemke, Los Angeles, Calif., assignor, by mesne assignments, to Bell & Howell Company, Chicago, Ill., a corporation of Illinois Filed Sept. 10, 1962, Ser. No. 222,575
3 Claims. (Cl. 340—174.1)

This invention relates to magnetic heads for reproducing signals recorded on magnetic tape and, more particularly, is concerned with an improved magnetic head of the type which is sensitive to the level of flux rather than the rate of change of flux produced by the magnetic tape.

It has heretofore been proposed to provide a magnetic head which is sensitive directly to magnetic flux rather than to the rate of change of flux. For example, Patent No. 2,999,135 describes such a transducer, referred to as a flux-gate transducer. In the flux-gate transducer, the magnetic core of the head has two windings which are connected to a common high-frequency signal source, the windings being wound such that they generate opposing flux in the core. These windings are wound on a portion of the core which is arranged to saturate readily, the high-frequency signal driving the core into saturation on each half cycle. Flux added to the core by the magnetized tape as it is moved past the gap in the core changes the point in each cycle at which the core saturates. This change in phase of the point of saturation in relation to the high-frequency signal is detected by a suitable detector.

While the flux-gate transducer has the advantage that it is sensitive to the absolute level of the flux generated across the gap by the magnetic tape, known transducers of this design have generally had a poorer signal-to-noise ratio than can be achieved in conventional magnetic heads.

The present invention is directed to an improvement in the flux-gate type of magnetic head, which exhibits superior signal-to-noise ratio characteristics to that heretofore achieved.

Figure 1:
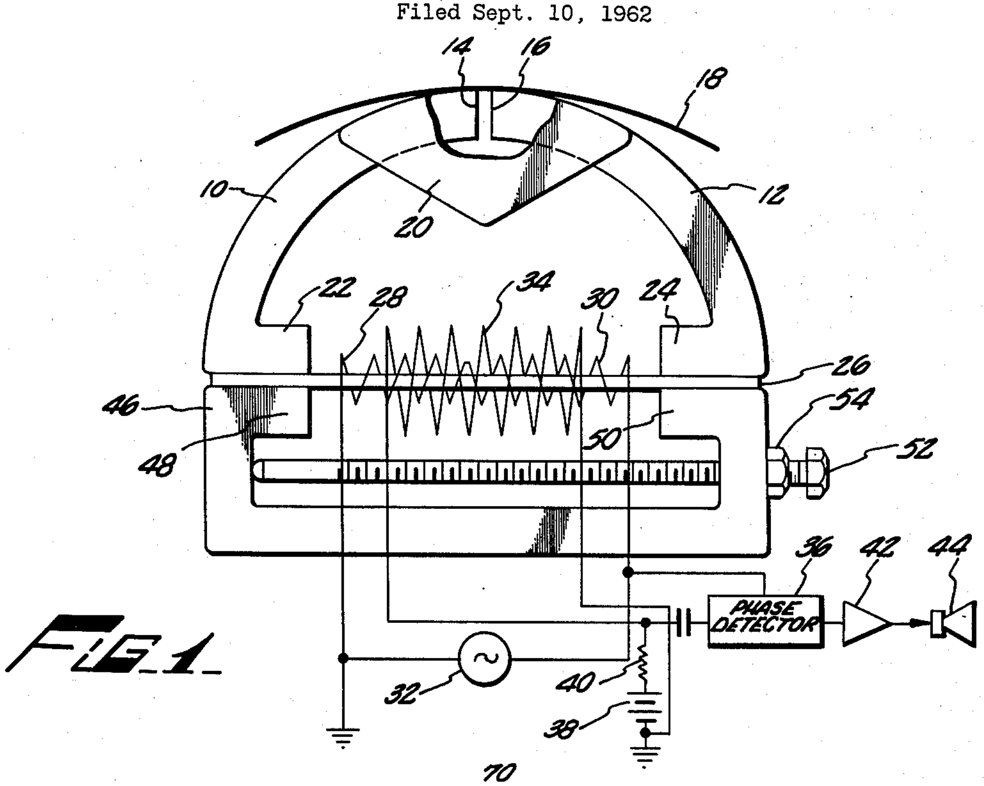
Figure 2:
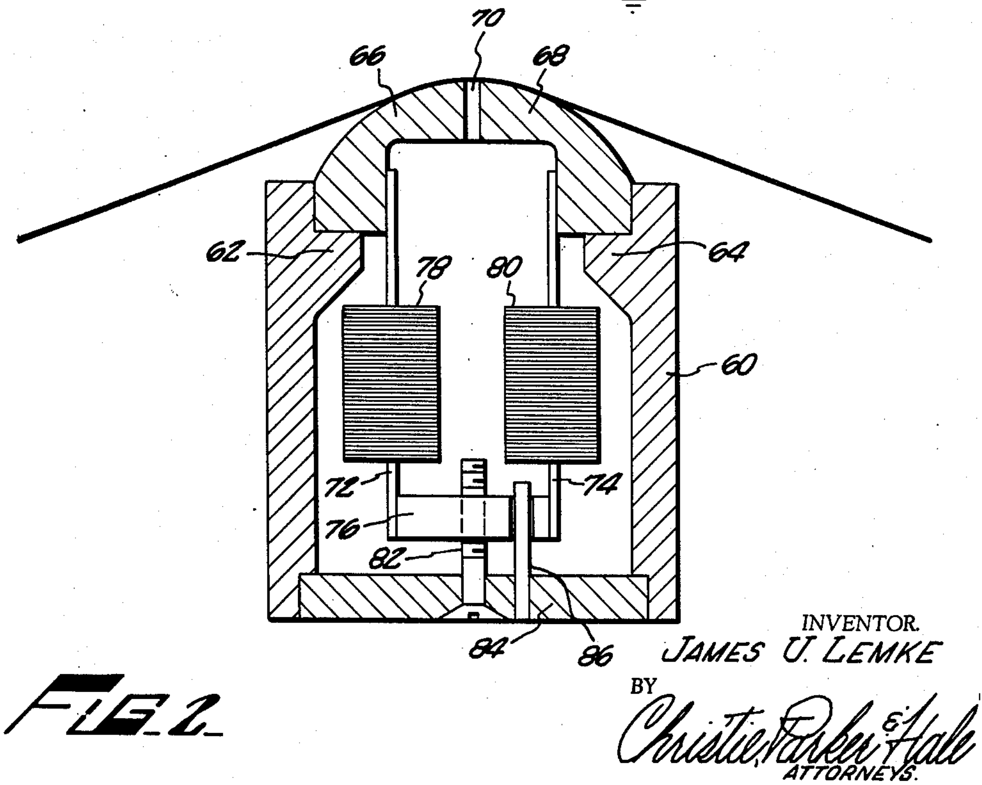

For a more complete understanding of the invention, reference should be had to the accompanying drawing, wherein:

FIGURE 1 is a diagrammatic representation of one embodiment of the invention; and FIGURE 2 is a sectional view of an alternative construction of the present invention.

Referring to FIGURE 1, the numerals 10 and 12 indicate a pair of core elements which terminate at one end in opposing surfaces 14 and 16, to define the pole faces of a magnetic gap. The core elements 10 and 12 are shaped to form a suitable surface adjacent the gap, across which magnetic tape can be drawn, a section of the magnetic tape being indicated at 18. The core elements 10 and 12 are made of suitable magnetic material, such as Mu metal, ferrite, Alfenol, or the like having a high magnetic permeability. The two core elements may be joined at the gap by a non-magnetic cement material, such as solder or the like, which fills the gap and secures the core elements 10 and 12 in fixed relation to each other. In addition, non-magnetic plates or shields, such as indicated at 20, may be provided on either side of the gap, the shields being soldered or otherwise secured to the core elements 10 and 12 to form a unitary mechanical structure at the gap.

Core elements 10 and 12 at their opposite ends may be turned inwardly and directed toward each other as indicated at 22 and 24. A thin strip of magnetic material 26 bridges the space between the in-turned ends 22 and 24 of the core elements 10 and 12. The magnetic strip 26 preferably is of smaller cross-section than the core elements so that it saturates more readily than the core elements 10 and 12.

A pair of drive windings 28 and 30 are wound series opposing on the saturating strip 26 and are connected across a high-frequency source 32. The windings 28 and 30 are wound such that they generate opposing flux in the strip 26. An output winding 34 is wound concentrically about the windings 28 and 30. The output winding 34 is connected to a suitable phase detector 36 along with a reference signal from the source 32. A D.C. bias may also be applied to the output winding by a battery 38 and resistor 40 connected across the output winding 34 to null external field effects. The output from the phase detector is applied to a power amplifier 42 and used to drive a speaker or other suitable output means 44.

Operation of the magnetic head, as thus far described, is substantially the same as that disclosed in Patent No. 2,999,135. The flux added to the magnetic circuit by the magnetic tape passing over the gap changes the point in the half-cycles of the high-frequency signal applied to the driver windings at which saturation takes place in the strip 26. Because of the transfer characteristics of the saturating material of the strip 26, the signal derived from the output winding has a phase and pulse width which varies as a function of the direction and magnitude of the flux added to the core by the magnetic tape.

While the device, as thus far described, has the advantage that it responds to the absolute flux level introduced at the gap, the signal-to-noise ratio of the head has been found to be somewhat inferior to conventional head design. The principal source of noise in the magnetic head is due to the Barkhausen effect in the saturable strip. Barkhausen effect is the name given to a phenomenon found in magnetic materials, in which the flux actually increases in steps or jumps, rather than smoothly and continuously, in the presence of an increasing magnetic field. These jumps are believed to be caused by the sudden magnetic realignment of domain volumes in the material.

It is known that certain Permalloy materials, when properly annealed, exhibit isotropic susceptibility of magnetic flux. However, when such material is stressed within its elastic limit, the permeability along the direction of stress will be changed. For example, a material known as 68 Permalloy shows a drastic change in hysteresis when under tension. Since the Permalloy has a positive magnetostriction constant, the permeability is increased in the direction of strain and reduced in the transverse direction. Thus the permeability can be increased by placing the material under tension. However, this does not affect the Barkhausen noise, since the placing of the materials under tension does not alter the crystalline potential which limits domain wall motion.

The present invention utilizes the above principles to provide improved signal-to-noise ratios by placing the saturable strip 26 under tension within the elastic limit of the Permalloy material used for the strip. This may be accomplished, for example, by the arrangement shown in FIGURE 1, in which a bracket 46 made of non-magnetic material spans the ends of the strip 26. The bracket 46 is provided with in-turned end portions 48 and 50 which are brazed or otherwise secured to the strip 26. A bolt 52 threadedly engages one end of the bracket 46 and bears against the inner surface of the other end of the bracket 46. The bolt 52 may be provided with a lock nut 54.

It has been found that by placing the saturable strip 26 under tension stress within its elastic limit, the signal sensitivity of the head is substantially increased while the noise level is affected very little. Thus, a significant gain in the signal-to-noise ratio is obtained.

An alternative head design is shown in FIGURE 2, which comprises a hollow rectangular frame 60 having a pair of shoulders formed internally as indicated at 62 and 64. A pair of pole pieces 66 and 68 are seated respectively on the shoulders 62 and 64. A non-magnetic gap is maintained between the pole pieces 66 and 68 by the thin piece of non-magnetic material 70. A pair of saturable magnetic strips 72 and 74 are joined at their upper end to the respective pole pieces 66 and 68 by welding or other suitable means. The lower ends of the strips 72 and 74 are welded to a spacer block 76 of magnetic material. A pair of drive windings and concentrically wound output windings are provided on each of the strips, as indicated at 78 and 80. Tension is applied to the strips 72 and 74 by means of a screw 82 which passes through a bottom plate 84 and threadedly engages the spacer block 76. By tightening the screw 82, the strips 72 and 74 are placed under tension. A pin 86 of non-magnetic material prevents the spacer block 76 from rotating during the adjustment of the screw 82.

What is claimed is:

1. A magnetic transducer head comprising a magnetic core forming a closed magnetic flux path, the core having a high reluctance gap, a portion of the core being of reduced cross-section and made of a material having a high permeability that increases in the direction of tensive stress, a pair of series connected windings wound such that a current passing through the two windings produces opposing flux in the core, an output winding wound on the core, and means for maintaining said portion of the core under tension.

2. A magnetic transducer comprising a core of magnetic material, means for inducing changing flux in the core in response to a varying magnetic field in proximity to the core, a portion of the core being more easily saturable than the balance of the core, a pair of windings connected in series for generating opposing fluxes in the core in response to an exiciting current, an output winding on the core, and means for maintaining said portion of the core under tension.

3. A magnetic transducer comprising a core of magnetic material, means for inducing changing flux in the core in response to a varying magnetic field in proximity to the core, a portion of the core being more easily saturable than the balance of the core, a pair of windings connected in series for generating opposing fluxes in the core in response to an exiciting current, an output winding on the core, and means for maintaining said portion of the core under stress.

References Cited by the Examiner

UNITED STATES PATENTS

| | | | |
|---|---|---|---|
| 2,658,113 | 11/53 | Holmes | 179—100.2 |
| 2,722,569 | 11/55 | Loper | 179—100.2 |
| 2,999,135 | 9/61 | Wiegand | 179—100.2 |
| 3,016,429 | 1/62 | Johnson | 179—100.2 |

IRVING L. SRAGOW, *Primary Examiner.*